(12) United States Patent
Shimanaka et al.

(10) Patent No.: US 12,264,217 B2
(45) Date of Patent: Apr. 1, 2025

(54) SURFACE TREATMENT FILM, MANUFACTURING METHOD THEREFOR, AND ARTICLE

(71) Applicants: DAINICHISEIKA COLOR & CHEMICALS MFG. CO., LTD., Tokyo (JP); KYOTO UNIVERSITY, Kyoto (JP)

(72) Inventors: Hiroyuki Shimanaka, Tokyo (JP); Yoichi Tagi, Tokyo (JP); Hiromasa Sato, Tokyo (JP); Miho Tanishima, Tokyo (JP); Yoshinobu Tsujii, Kyoto (JP); Keita Sakakibara, Kyoto (JP)

(73) Assignees: DAINICHISEIKA COLOR & CHEMICALS MFG. CO., LTD., Tokyo (JP); KYOTO UNIVERSITY, Kyoto (JP)

(*) Notice: Subject to any disclaimer, the term of this patent is extended or adjusted under 35 U.S.C. 154(b) by 314 days.

(21) Appl. No.: 18/006,474

(22) PCT Filed: Aug. 3, 2021

(86) PCT No.: PCT/JP2021/028822
§ 371 (c)(1),
(2) Date: Jan. 23, 2023

(87) PCT Pub. No.: WO2022/030509
PCT Pub. Date: Feb. 10, 2022

(65) Prior Publication Data
US 2023/0348654 A1 Nov. 2, 2023

(30) Foreign Application Priority Data
Aug. 6, 2020 (JP) .................................. 2020-134082

(51) Int. Cl.
| | | |
|---|---|---|
| *C08G 59/06* | (2006.01) | |
| *C03C 17/34* | (2006.01) | |
| *C08F 214/28* | (2006.01) | |
| *C09D 127/20* | (2006.01) | |
| *C09D 163/00* | (2006.01) | |

(52) U.S. Cl.
CPC .......... *C08G 59/06* (2013.01); *C03C 17/3405* (2013.01); *C08F 214/285* (2013.01); *C09D 127/20* (2013.01); *C09D 163/00* (2013.01); *C03C 2218/31* (2013.01)

(58) Field of Classification Search
CPC ......... C08G 59/06; B32B 27/00–27/42; B05D 7/00–7/5885; C09D 1/00–201/10
See application file for complete search history.

(56) References Cited

U.S. PATENT DOCUMENTS

| | | |
|---|---|---|
| 6,441,066 B1 | 8/2002 | Woodworth et al. |
| 2011/0189469 A1 | 8/2011 | Stenzel et al. |
| 2014/0235755 A1* | 8/2014 | Gopalan .................. C08F 20/32 523/400 |

FOREIGN PATENT DOCUMENTS

| | | | |
|---|---|---|---|
| CN | 105833749 | 8/2016 | |
| EP | 3363835 A1 * | 8/2018 | ............... B05D 1/18 |
| JP | 2008-133434 | 6/2008 | |
| JP | 2010-261001 | 11/2010 | |
| JP | 2011-529789 | 12/2011 | |
| WO | 2020/059368 | 3/2020 | |

OTHER PUBLICATIONS

International Search Report, issued in the corresponding PCT application No. PCT/JP2021/028822, dated Oct. 19, 2021, 5 pages (including machine translation).
Tsujii et al., "Structure and Properties of High-Density Polymer Brushes prepared by Surface-Initiated Living Radical Polymerization", Adv. Polym. Sci., vol. 197, 2006, pp. 1-45 (cited in the specification).
Fan et al., "Biomimetic Anchor for Surface-Initiated Polymerization from Metal Substrates", J. Am. Chem. Soc., vol. 127, 2005, pp. 15843-15847 (cited in the specification).
Nomura et al., "Lubrication mechanism of concentrated polymer brushes in solvents: effect of solvent viscosity", Polym. Chem., vol. 3, 2012, pp. 148-153 (cited in the specification).

* cited by examiner

*Primary Examiner* — Prashant J Khatri
(74) *Attorney, Agent, or Firm* — HSML P.C.

(57) ABSTRACT

The present invention provides a surface treatment film that is capable of imparting durability such as wear resistance, friction resistance, chemical resistance, heat resistance, and solvent resistance to the surfaces of various substrates, and that exhibits excellent adhesion to the surfaces of the substrates. The surface treatment film is provided on the surface of a substrate. The surface treatment film has a laminated structure that includes a polymer layer (i) disposed on the surface side of the substrate and a polymer layer (ii) disposed on the polymer layer (i). The polymer layer (i) contains a first polymer derived from a polymerization initiation group-containing polymer, such as a polyester having, in a side chain, a functional group represented by formula (1) wherein $R_1$ represents a hydrogen atom, a methyl group, or the like, $R_2$ represents a methyl group or the like, X represents a chlorine atom or the like, Y represents O or NH, and * shows a bonding position. The polymer layer (ii) contains a second polymer which contains a constituent unit derived from a monomer such as an aromatic vinyl-based monomer and which extends using the functional group represented by formula (i) as a polymerization initiation point.

14 Claims, No Drawings

SURFACE TREATMENT FILM, MANUFACTURING METHOD THEREFOR, AND ARTICLE

TECHNICAL FIELD

The present invention relates to a surface treatment film provided on the surface of a substrate, a method for producing the same, and an article provided with this surface treatment film.

BACKGROUND ART

As a method of modifying a substrate, a method of forming a polymer layer physically or chemically bonded to the surface on the surface of the substrate by acting on the substrate a polymer having at the end thereof a group that can be adsorbed to or react with the substrate is known. In addition, a method of forming a polymer layer grafted from the surface of a substrate by polymerizing a monomer using a polymerizable group applied to the surface of the substrate as a starting point is also known.

In recent years, so-called "concentrated polymer brushes" that are grafted at a high density onto a substrate utilizing a living radical polymerization technique developed in the 1990s have been studied. In this concentrated polymer brush, polymer chains are grafted onto the substrate at a high density of 1 to 4 nm intervals. By means of such a concentrated polymer brush, the surface of a substrate can be modified and characteristics such as low friction, suppression of protein adsorption, size exclusion characteristics, hydrophilicity, water repellency, can be imparted (for example, Patent Literatures 1 and 2, and Non-Patent Literatures 1 to 3).

CITATION LIST

Patent Literature

Patent Literature 1: Japanese Patent Laid-Open No. 2008-133434
Patent Literature 2: Japanese Patent Laid-Open No. 2010-261001

Non-Patent Literature

Non-Patent Literature 1: Adv. Polym. Sci., 2006, 197, 1-45
Non-Patent Literature 2: J. Am. Chem. Soc., 2005, 127, 15843-15847
Non-Patent Literature 3: Polym. Chem., 2012, 3, 148-153

SUMMARY OF INVENTION

Technical Problem

Concentrated polymer brushes (hereinafter also referred to simply as "brushes") exhibit low friction in the tribology field of lubrication, friction, and wear. However, the polymer layer of a brush may be easily detached from the surface of a substrate by a lubricating oil or solvent used at the time of friction. A concentrated polymer brush is formed by polymerization after forming a polymerization initiation group layer which is a monomolecular film layer. However, the bonding force and adhesion of the monomolecular film layer are weak, and therefore it is considered that the polymer layer is easily detached by friction or a solvent.

In addition, the surface of a substrate for forming a brush has irregularities, and therefore when the polymer layer of the brush cannot fully cover the irregularities, the brush may not exhibit low friction in some cases. In order to cover the roughness of the surface of a substrate, it is also possible to form a brush after polishing and smoothing the surface of the substrate, but since a step of polishing the surface of the substrate is added, it has been disadvantageous in terms of costs and the like. Note that by forming a brush having a thick film thickness, it is possible to cover the roughness of the surface of the substrate. However, in order to form a brush having a thick film thickness, special conditions and apparatus, such as living radical polymerization under a high pressure condition (for example, 100 to 1,000 MPa) for grafting onto the surface of the substrate, are required. For this reason, it is not always easy to form a brush having a thick film thickness, and it tends to be disadvantageous in terms of costs.

The present invention has been completed in view of such problems of the conventional techniques, and the present invention intends to provide a surface treatment film that is capable of imparting durability such as wear resistance, friction resistance, chemical resistance, heat resistance, and solvent resistance to the surfaces of various substrates, and that exhibits excellent adhesion to the surfaces of the substrates. In addition, the present invention intends to provide a method for producing the above-described surface treatment film and an article provided with the above-described surface treatment film.

Solution to Problem

As a result of studies, the present inventors have found that the above-described problems can be solved by providing a polymer layer having high mechanical strength, having excellent chemical resistance and solvent resistance, and having a polymerization initiation group on the surface of a substrate, and utilizing this polymerization initiation group to perform graft polymerization, thereby further providing another polymer layer.

That is, according to the present invention, a surface treatment film described below is provided.

[1] A surface treatment film provided on a surface of a substrate, the surface treatment film having a laminated structure comprising a polymer layer (i) disposed on a surface side of the substrate and a polymer layer (ii) disposed on the polymer layer (i), wherein the polymer layer (i) comprises a first polymer derived from at least one polymerization initiation group-containing polymer selected from the group consisting of a polyester, a polyurethane, a polyamide, a polyimide, and a polyepoxy each having, in a side chain, a functional group that functions as a polymerization initiation group and is represented by the following formula (1), and in the polymerization initiation group-containing polymer, a content of the functional group represented by the formula (1) is 0.5 mmol/g or more, the polymer layer (ii) has a film thickness of 200 nm or more, and the polymer layer (ii) comprises a second polymer comprising a constituent unit derived from at least one monomer selected from the group consisting of an aromatic vinyl-based monomer, a (meth)acrylate-based monomer, and a (meth)acrylamide-based monomer and extending using the functional group represented by the following formula (1) as a polymerization initiation point.

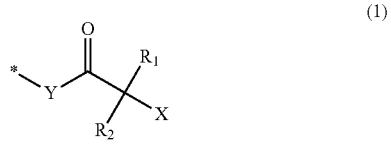

(1)

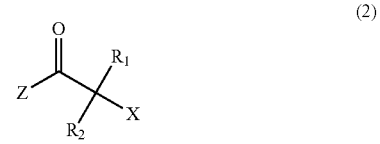

(2)

wherein $R_1$ represents a hydrogen atom, a methyl group, an ethyl group, a phenyl group, or an acyl group, $R_2$ represents a methyl group, an ethyl group, or an acyl group, X represents a chlorine atom, a bromine atom, or an iodine atom, Y represents O or NH, and * shows a bonding position.

[2] The surface treatment film according to [1], wherein the polymer layer (i) has a three-dimensional network structure.

[3] The surface treatment film according to [1] or [2], wherein the polymer layer (i) has a film thickness of 500 nm or more.

[4] The surface treatment film according to any one of [1] to [3], wherein the polymerization initiation group-containing polymer is at least one selected from the group consisting of a polyester, a polyurethane, a polyimide, and a polyepoxy each having a functional group represented by the formula (1) in a side chain.

[5] The surface treatment film according to any one of [1] to [4], wherein the polymer layer (ii) comprises a solvent and is swollen.

[6] The surface treatment film according to any one of [1] to [5], provided on the surface of the substrate excluding a porous substrate.

[7] The surface treatment film according to any one of [1] to [6], wherein the second polymer has a number average molecular weight of 100,000 or higher in terms of polystyrene, measured by gel permeation chromatography.

In addition, according to the present invention, a method for producing the surface treatment film, described below, is provided.

[8] A method for producing the surface treatment film according to any one of [1] to [7], the method comprising: a step of forming a polymer layer (iii) comprising the polymerization initiation group-containing polymer on the surface of the substrate; and a step of polymerizing one or monomers selected from the group consisting of an aromatic vinyl-based monomer, a (meth)acrylate-based monomer, and a (meth)acrylamide-based monomer in the presence of the polymer layer (iii), thereby forming a laminated structure comprising the polymer layer (i) comprising the first polymer derived from the polymerization initiation group-containing polymer and the polymer layer (ii) comprising the second polymer disposed on the polymer layer (i) and comprising a constituent unit derived from the monomer.

[9] The method for producing the surface treatment film according to [8], wherein the polymerization initiation group-containing polymer is applied on the surface of the substrate to form the polymer layer (iii).

[10] The method for producing the surface treatment film according to [8], wherein at least one polymer selected from the group consisting of a polyester, a polyurethane, a polyamide, a polyimide, and a polyepoxy each having a hydroxy group or an amino group in a side chain is applied on the surface of the substrate, and thereafter a compound represented by the following formula (2) is reacted with the polymer to form the polymer layer (iii).

wherein $R_1$ represents a hydrogen atom, a methyl group, an ethyl group, a phenyl group, or an acyl group, $R_2$ represents a methyl group, an ethyl group, or an acyl group, X represents a chlorine atom, a bromine atom, or an iodine atom, and Z represents a chlorine atom or a bromine atom.

[11] The method for producing the surface treatment film according to any one of [8] to [10], wherein the monomer is subjected to surface-initiated living radical polymerization in the presence of the polymer layer (iii).

[12] The method for producing the surface treatment film according to any one of [8] to [11], wherein the monomer is polymerized under a pressure condition of 10 to 1,000 MPa.

[13] The method for producing the surface treatment film according to any one of [8] to [12], wherein the monomer is polymerized under a pressure condition of 100 to 1,000 MPa.

Further, according to the present invention, an article described below is provided.

[14] An article comprising: a substrate; and the surface treatment film according to any one of [1] to [7] provided on a surface of the substrate.

Advantageous Effects of Invention

The present invention can provide a surface treatment film that is capable of imparting durability such as wear resistance, friction resistance, chemical resistance, heat resistance, and solvent resistance to the surfaces of various substrates, and that exhibits excellent adhesion to the surfaces of the substrates. In addition, the present invention can provide a method for producing the above-described surface treatment film, and an article provided with the above-described surface treatment film.

DESCRIPTION OF EMBODIMENTS

<Surface Treatment Film and Method for Producing Same>

Hereinafter, embodiments of the present invention will be described, but the present invention is not limited to the following embodiments. A surface treatment film of the present invention is a film provided on the surface of a substrate and has a laminated structure including a polymer layer (i) disposed on the surface side of the substrate and a polymer layer (ii) formed on this polymer layer (i). The polymer layer (i) contains a first polymer derived from at least one polymerization initiation group-containing polymer selected from the group consisting of a polyester, a polyurethane, a polyamide, a polyimide, and a polyepoxy each having, in a side chain, a functional group that functions as a polymerization initiation group and is represented by formula (1). In this polymerization initiation group-containing polymer, the content of the functional group represented by formula (1) is 0.5 mmol/g or more. Then, the polymer layer (ii) contains a second polymer containing a constituent unit derived from at least one monomer selected from the group consisting of an aromatic vinyl-based monomer, a (meth)acrylate-based monomer, and a (meth)acrylamide-based monomer and extending using the functional group represented by the formula (1) as a polymerization initiation point. Hereinafter, details on the surface treatment film of the present invention will be described.

(Polymer Layer (i))

The surface treatment film has a laminated structure including a polymer layer (i) and a polymer layer (ii). The polymer layer (i) is a layer disposed on the surface side of the substrate and is a layer containing a first polymer derived from at least one polymerization initiation group-containing polymer (hereinafter, also referred to as "initiation group polymer") selected from the group consisting of a polyester, a polyurethane, a polyamide, a polyimide, and a polyepoxy each having, in a side chain, a functional group that functions as a polymerization initiation group and is represented by the following formula (1), and the polymer layer (i) is preferably a layer formed substantially from the first polymer.

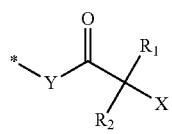

(1)

wherein $R_1$ represents a hydrogen atom, a methyl group, an ethyl group, a phenyl group, or an acyl group, $R_2$ represents a methyl group, an ethyl group, or an acyl group, X represents a chlorine atom, a bromine atom, or an iodine atom, Y represents O or NH, and * shows a bonding position.

For example, a component (coating liquid) containing a polymerization initiation group-containing polymer having a functional group represented by formula (1) in a side chain is applied and dried, and cured on the surface of the substrate, and thereby a polymer layer (polymer layer (iii)) containing the polymerization initiation group-containing polymer can be formed. Then, when one or more monomers selected from the group consisting of an aromatic vinyl-based monomer, a (meth)acrylate-based monomer, and a (meth)acrylamide-based monomer is polymerized in the presence of this polymer layer (iii) by a given method, the second polymer extends using the functional group represented by formula (I) as a polymerization initiation point. Thereby, the polymer layer (i) containing the first polymer is formed on the surface of the substrate, and the polymer layer (ii) containing the second polymer, or preferably the polymer layer (ii) formed substantially formed from the second polymer, is disposed on the polymer layer (i), so that the surface treatment film can be obtained.

The halogen atom, such as a chlorine atom represented by X in formula (1) is eliminated as a halogen radical by the action of light, heat, a radical, or the like, and a tertiary or quaternary carbon radical is generated. The tertiary or quaternary carbon radical generated attacks the above-described monomer having a radically polymerizable group and undergoes reaction, and thereby the second polymer extends.

The polymerization initiation group-containing polymer is a non-vinyl-based polymer, such as a polyester, a polyurethane, a polyamide, a polyimide, and a polyepoxy each having, in a side chain, a functional group that functions as a polymerization initiation group and is represented by formula (1). The non-vinyl-based polymer having a functional group represented by formula (1) in a side chain can be obtained, for example, using a polymerization component containing a monomer having a functional group represented by formula (1). In addition, the monomer having a functional group represented by formula (1) can be obtained by, for example, reacting a polymerization initiation group-containing compound, such as a compound represented by the following formula (3), an acid anhydride thereof, or an acid halide thereof, and a compound having a hydroxy group, an amino group, an epoxy group, an isocyanate group, or the like.

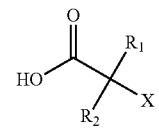

(3)

wherein $R_1$ represents a hydrogen atom, a methyl group, an ethyl group, a phenyl group, or an acyl group, $R_2$ represents a methyl group, an ethyl group, or an acyl group, and X represents a chlorine atom, a bromine atom, or an iodine atom.

The polymerization initiation group-containing compound, such as a compound represented by formula (3), is reacted with an epoxy group of glycidol or a compound having two or more epoxy groups, or an amino group of a compound having an amino group and a hydroxy group, such as 2-aminopropanediol, to obtain a diol component. Then, by subjecting the obtained diol component and a dicarboxylic acid or another diol to a condensation reaction, the polyester can be obtained. In addition, by reacting the polymerization initiation group-containing compound, such as a compound represented by formula (3), and a diisocyanate, another diol, a diamine, or the like, the polyurethane can be obtained.

The polymerization initiation group-containing compound, such as a compound represented by formula (3), is reacted with a compound having three or more amino groups to obtain a diamine component. Then, by subjecting the obtained diamine component and a dicarboxylic acid or an acid anhydride to a condensation reaction, the polyamide or the polyimide can be obtained. In addition, by reacting a urethane prepolymer prepared using an isocyanate and a diol with the above-described diamine component as a chain extender, the polyurethane can be obtained. Further, by reacting the above-described diamine component and a compound having two or more epoxy groups, the polyepoxy can be obtained. The type of the polymerization initiation group-containing polymer (first polymer) can appropriately be selected taking adhesion to the substrate, and the like into consideration. In addition, the polymerization initiation group-containing polymer can also be obtained by reacting the above-described non-vinyl-based polymer having a hydroxy group or an amino group in a side chain with the polymerization initiation group-containing compound, such as a compound represented by formula (3).

Examples of the polymerization initiation group-containing compound, such as a compound represented by formula (3), include halogen-substituted carboxylic acid compounds, such as 2-chloropropionic acid, 2-chlorobutyric acid, 2-chloroisobutyric acid, 2-chlorovaleric acid, 2-bromopropionic acid, 2-bromobutyric acid, 2-bromoisobutyric acid, 2-bromovaleric acid, α-bromophenyl acetic acid, and α-bromo-4-chloroacetic acid, acid anhydrides thereof, and acid halides thereof. As the polymerization initiation group-containing compound such as a compound represented by formula (3), 2-bromoisobutyric acid or a derivative thereof is preferable. These compounds are products sold on the market and are easily available, and from these compounds, a halogen atom is easily eliminated, and in addition, a radical which is generated from these compounds is relatively stable and therefore a side reaction can be suppressed.

The non-viny-based polymer (polymerization initiation group-containing polymer) having a functional group represented by formula (1) in a side chain is dissolved in a solvent, such as an organic solvent, to prepare a solution (coating liquid). Then, the prepared coating liquid is applied on the substrate and is thereafter, for example, dried, thereby the polymer layer (iii) containing the polymerization initiation group-containing polymer can be formed on the surface of the substrate. It is preferable to form a polymer layer (iii) having a three-dimensional network structure (crosslinked structure) by using a polymerization initiation group-containing polymer having a reactive group having active hydrogen, such as a hydroxy group, a carboxy group, an amino group, or an alkoxysilyl group, and reacting the polymerization initiation group-containing polymer with a crosslinking agent or curing agent having a group that can react with these reactive groups. Thereby, a polymer layer (i) having a three-dimensional network structure, and a surface treatment film provided with such a polymer layer (i), in which various properties, such as mechanical strength, adhesion, chemical resistance, flexibility, and friction resistance, are further improved, can be formed.

When the reactive group is a hydroxy group, a crosslinked structure (three-dimensional network structure) having a urethane bond can be formed by reacting a crosslinking agent having an isocyanate group or a blocked isocyanate group. When the reactive group is a carboxy group, a crosslinking agent, such as, for example, a carbodiimide-based crosslinking agent, an epoxy-based crosslinking agent, a melamine-based crosslinking agent, and an oxazoline-based crosslinking agent, can be reacted. When the reactive group is an amino group, a crosslinking agent, such as an isocyanate-based crosslinking agent, an epoxy-based crosslinking agent, and a melamine-based crosslinking agent, can be reacted. When the reactive group is an alkoxysilyl group, the alkoxysilyl group can be self-reacted, and a monomer such as tetraethoxysilane may be used in combination.

Examples of the method for applying the coating liquid on the surface of the substrate include a screen printing method, a dip coating method, an inkjet method, a spin coating method, a blade coating method, a bar coating method, a slit coating method, an edge casting method, a spray coating method, a roll coating method, a curtain coating method, a gravure printing method, a flexographic printing method, and a gravure offset printing method. Among these, an inkjet method that is capable of applying (printing) the coating liquid into an arbitrary shape is preferable.

In addition, after at least one polymer (non-vinyl-based polymer) selected from the group consisting of a polyester, a polyurethane, a polyamide, a polyimide, and a polyepoxy each having a hydroxy group or an amino group in a side chain is applied on the surface of the substrate, a compound represented by the following formula (2) is reacted, and thereby the polymer layer (iii) can also be formed.

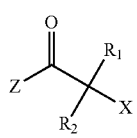

(2)

wherein $R_1$ represents a hydrogen atom, a methyl group, an ethyl group, a phenyl group, or an acyl group, $R_2$ represents a methyl group, an ethyl group, or an acyl group, X represents a chlorine atom, a bromine atom, or an iodine atom, and Z represents a chlorine atom or a bromine atom.

An amine compound, such as pyridine or triethylamine, is preferably used in order to accelerate the reaction between the non-vinyl-based polymer having a hydroxy group or amino group in a side chain and the compound represented by formula (2). When the hydroxy group or amino group of the non-vinyl-based polymer and the compound represented by formula (2) are reacted in the presence of the amine compound, dehydrohalogenation can be accelerated.

The content of the functional group represented by formula (1) in the polymerization initiation group-containing polymer is 0.5 mmol/g or more, preferably 1 mmol/g or more, and more preferably 1.2 mmol/g or more and 100 mmol/g or less. When the content of the functional group that functions as a polymerization initiation group and is represented by formula (1) is less than 0.5 mmol/g, the surface occupation ratio and graft formation ratio of the polymer layer (ii) formed are insufficient. Therefore, it is difficult to sufficiently exhibit the characteristics derived from the polymer layer (ii), such as low friction, lubricity, a liquid retention property, high elasticity, a size exclusion effect, and a supercooling effect.

The film thickness of the polymer layer (i) is preferably 100 nm or more, more preferably 150 nm or more, and particularly preferably 500 nm or more and 10,000 nm or less. By setting the film thickness of the polymer layer (i) to 100 nm or more, the adhesion to the surface of the substrate is further improved, and the surface of the substrate can be modified more effectively. The film thicknesses of the respective polymer layers (polymer layers (i) to (iii)) and the surface treatment film can be measured by, for example, a measurement method using precision equipment, such as an atomic force microscope, or an ellipsometer, a measurement method by observation using an electron microscope, or a measurement method using a film thickness measurement apparatus.

(Polymer Layer (ii))

A particular monomer is polymerized in the presence of the polymer layer (iii) disposed on the surface of the substrate. Thereby, the second polymer is extended using the functional group represented by formula (1) as a polymerization initiation point and a surface treatment film having a laminated structure including a polymer layer (i) disposed on the surface side of the substrate and a polymer layer (ii) disposed on the polymer layer (i) can be obtained.

As the particular monomer, one or more monomers selected from the group consisting of an aromatic vinyl-based monomer, a (meth)acrylate-based monomer, and a (meth)acrylamide-based monomer are used. Among these, a (meth)acrylate-based monomer is preferable from the reason that the polymerization rate is high, the polymerization condition is calm, etc.

Examples of the aromatic vinyl-based monomer include styrene, vinyltoluene, vinylhydroxybenzene, chloromethylstyrene, vinylnaphthalene, vinylbiphenyl, vinylethylbenzene, vinyldimethylbenzene, and α-methylstyrene.

Examples of the (meth)acrylate-based monomer include aliphatic, alicyclic, and aromatic alkyl (meth)acrylates, such as methyl (meth)acrylate, ethyl (meth)acrylate, propyl (meth)acrylate, isopropyl (meth)acrylate, butyl (meth)acrylate, 2-methylpropane (meth)acrylate, t-butyl (meth)acrylate, pentyl (meth)acrylate, hexyl (meth)acrylate, octyl (meth)acrylate, 2-ethylhexyl (meth)acrylate, nonyl (meth)

acrylate, decyl (meth)acrylate, isodecyl (meth)acrylate, lauryl (meth)acrylate, tetradecyl (meth)acrylate, octadecyl (meth)acrylate, behenyl (meth)acrylate, isostearyl (meth) acrylate, cyclohexyl (meth)acrylate, t-butylcyclohexylmethyl (meth)acrylate, isobornyl (meth)acrylate, trimethylcyclohexyl (meth)acrylate, cyclodecyl (meth)acrylate, cyclodecylmethyl (meth)acrylate, benzyl (meth)acrylate, t-butylbenzotriazole phenylethyl (meth)acrylate, phenyl (meth)acrylate, naphthyl (meth)acrylate, and allyl (meth)acrylate.

Note that as the (meth)acrylate-based monomer, a (meth)acrylate-based compound containing a hydroxy group, a glycol group, an acid group (such as a carboxy group, a sulfonate group, or a phosphate group), an oxygen atom, an amino group, a nitrogen atom, or the like can also be used.

Further, examples of the (meth)acrylamide-based monomer include (meth)acrylamide, N,N-dimethyl (meth)acrylamide, N,N-diethyl (meth)acrylamide, N-hydroxyethyl (meth)acrylamide, and (meth)acryloyl morpholine.

The second polymer can be formed by performing surface-initiated radical polymerization or surface-initiated living radical polymerization using an organic solvent, an additive, a catalyst, and the like under a pressure condition of normal pressure to 1,000 MP, preferably under a pressure condition of 100 MP or higher. The monomer is preferably polymerized by atom transfer radical polymerization using a conventionally known metal complex because the polymerization is initiated from a polymerization initiation group having a halogen atom. Examples of the metal complex include complexes between copper chloride or copper bromide, and a polyamine such as dinonyl bipyridine, tridimethylaminoethylamine, and pentamethyldiethylenetriamine; and dichlorotris(triphenylphosphine)ruthenium. The atom transfer radical polymerization may be bulk polymerization or may be solution polymerization in which an organic solvent or the like is used. As the organic solvent, a hydrocarbon-based solvent, an ester-based solvent, a glycol-based solvent, an ether-based solvent, an amide-based solvent, an alcohol-based solvent, a sulfoxide-based solvent, a urea-based solvent, an ionic liquid, or the like can be used.

A heavy metal is used in the atom transfer radical polymerization, and therefore coloration and a load to the environment need to be taken into consideration and the heavy atom needs to be removed from the reaction system. For this reason, the polymerization is preferably performed in the presence of a general-purpose organic compound not using a heavy metal. Specifically, surface-initiated radical polymerization or surface-initiated living radical polymerization is preferably performed under the co-existence of at least one salt selected from the group consisting of a quaternary ammonium halide, a quaternary phosphonium halide, and an alkali metal halide. Thereby, polymerization can be performed with a commercially available inexpensive organic material or inorganic salt. In addition, there is no need to remove a metal, and therefore a load to the environment can be reduced and steps can also be simplified.

X (a halogen) in formula (1) is eliminated as a radical, and a monomer is inserted into a carbon radical generated simultaneously with the elimination of X, and thus the polymerization progresses. On that occasion, by allowing the above-described particular salt to co-exist, abstraction of a halogen radical or halogen exchange occurs and polymerization of the monomer progresses from the generated carbon radical, and thus the second polymer is formed.

Examples of the quaternary ammonium halide include benzyl trimethylammonium chloride, tetrabutylammonium bromide, tetrabutylammonium iodide, tetraoctylammonium iodide, nonylpyridinium chloride, and choline chloride. Examples of the quaternary phosphonium halide include tetraphenylphosphonium chloride, methyltributylphosphonium bromide, and tetrabutylphosphonium iodide. Examples of the alkali metal halide include lithium bromide and potassium iodide.

As the salt, an iodide salt is preferably used. By using the iodide salt, living radical polymerization progresses and a second polymer having a narrower molecular weight distribution can be obtained. In addition, a salt that can be dissolved in a polymerization solution, such as a quaternary ammonium iodide, a quaternary phosphonium iodide, and an alkali metal iodide, is preferably used, and a quaternary ammonium iodide is more preferably used. Examples of the quaternary ammonium iodide include benzyltetrabutylammonium iodide, tetrabutylammonium iodide, tetraoctylammonium iodide, dodecyltrimethylammonium iodide, octadecyltrimethylammonium iodide, and trioctadecylmethylammonium iodide.

From the viewpoint of enhancing the degree of activity and obtaining a second polymer having a higher concentration and a higher molecular weight, the amount of the salt based on the amount of the polymerization initiation group is preferably set to be equimolar or more, more preferably ten or more times the mols of the polymerization initiation group, or may be 100 or more times the mols of the polymerization initiation group.

In a method of using this quaternary salt or halide salt, the polymerization condition is not particularly limited. The polymerization is performed under a conventionally known condition. The temperature is preferably 60° C. or higher, and an organic solvent is preferably used as the solvent. As the solvent, a conventionally known solvent can be used and the solvent is not particularly limited. With regard to the solvent, any of the above-described conventionally known organic solvents can be used, but a solvent that dissolves the salt may preferably be used, and an organic solvent having high polarity, such as an alcohol-based, a glycol-based, an amide-based, a urea-based, or a sulfoxide-based solvent, or an ionic liquid, is preferable.

The polymerization is performed under a pressure condition of a normal pressure to 1,000 MPa, preferably 10 to 1,000 MPa, more preferably 100 to 1,000 MPa, still more preferably 200 to 800 MPa, and particularly preferably 300 to 600 MPa. Specifically, the polymerization is performed while pressure is uniformly applied through a medium such as water over the whole polymerization container in which the monomer and the substrate are placed. By performing the radical polymerization in a state where the pressure is applied, the termination reaction is suppressed and a second polymer having a higher molecular weight can be formed.

Preparing a container and apparatus bearable to the pressure of higher than 1,000 MPa is difficult and is not practical. As the molecular weight of the second polymer formed is larger, the film thickness of the polymer layer (ii) is thicker. By making the film thickness of the polymer layer (ii) thick, the surface of the substrate can be modified in such a way as to exhibit unprecedented properties. The film thickness of the polymer layer (ii) can be set to, for example, several nm to several μm, and can preferably be set to 100 nm or more, more preferably 200 nm or more, and particularly preferably 1,000 nm or more and 10,000 nm or less.

As a polymerization container, a container that is sealable and bearable to high pressure is preferably be used. In addition, the pressure needs to be transmitted into the inside of the container, and therefore a container having a part that deforms by pressure, such as a plastic soft part or stretchable part, is preferably used. Specifically, various containers, such as a polyethylene bottle, a PET bottle, a retort pouch, and a blister container, can be used. In addition, a container made of a material having heat resistance such that it is hard to deform by a temperature during polymerization is preferable. Further, a container made of a material having properties such as chemical resistance and solvent resistance such that it is hard to be affected by a polymerization solvent or the like is preferable. Examples of the material that forms a polymerization container include a polyolefin-based resin, a fluorine-based resin, a polyester-based resin, a polyamide-based resin, and engineering plastics. In addition, it is preferable not to allow a gas to enter into a polymerization container during polymerization whenever possible. For example, a polymerization solution is preferably charged into a polymerization container up to 90% or more of the volume of the polymerization container.

Above-described polymerization solution containing a substrate, a monomer, a catalyst, and the like is charged into a polymerization container and then polymerization is performed at normal pressure or applying external pressure of normal pressure or higher and 1,000 MPa or lower preferably under heating, and thereby the second polymer extends from a polymerization initiation point of the polymer layer (iii), so that the surface of the substrate can be modified. The surface of the substrate can be modified into an arbitrary characteristic according to the type of the monomer to be used, and the like. For example, by using a fluorine-based monomer, a polymer layer (ii) that is likely to repel water or oil and has a low surface tension can be formed. By using a monomer having a polyethylene glycol group, a carboxy group, or the like, a hydrophilic polymer layer (ii) such that water vapor hitting the polymer layer (ii) rapidly changes into a water droplets to make the polymer layer (ii) hard to become cloudy can be formed. Further, a biocompatible substrate to which protein or the like is unlikely to be adhered can also be produced. In addition, an extremely low friction polymer layer can be prepared by swelling a formed polymer layer (ii) with a lubricating oil or the like into a lubricating film.

It cannot be said that it is easy to verify the molecular weight of the second polymer forming the polymer layer (ii) formed. Thus, surface-initiated radical polymerization or surface-initiated living radical polymerization is preferably performed in the co-existence of the initiation group monomer having an initiation group same as the polymerization initiation group. Thereby, a free polymer not contained in the polymer layer (ii) is formed. Then, by measuring the molecular weight of the formed free polymer according to an ordinary method, the molecular weight of the second polymer forming the polymer layer (ii) can be inferred. The number average molecular weight (Mn) of the formed free polymer in terms of polystyrene, measured by gel permeation chromatography (GPC), is usually 1,000 to 10,000,000, preferably 100,000 or higher.

As the initiation group monomer, a compound having a group same as the polymerization initiation group is used. Specifically, compounds represented by the following formulas (4) to (6) can be used each as an initiation group monomer.

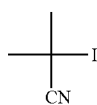

(4)

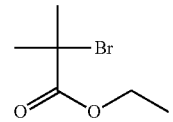

(5)

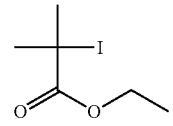

(6)

The polymer layer (ii) preferably contains a solvent, such as water, an organic solvent, or a mixed solvent thereof and is preferably swollen. By swelling the polymer layer (ii) with the solvent, the film thickness of the polymer layer (ii) can be increased. Further, the swollen polymer layer (ii) is preferable because it exhibits unique characteristics, such as strong resistance against compression and low friction. The polymer layer (ii) can be swollen by, for example, immersing, in the solvent, the substrate having a surface on which a surface treatment film has been formed.

<Article>

An article of the present invention is provided with a substrate and the above-described surface treatment film provided on a surface of this substrate. The type of the substrate is not particularly limited, and any of natural products, artifacts, inorganic members, and organic members can be used. Among others, a substrate that can be resistant to a polymerization solution is preferably used. Specific examples of the substrate include mechanical parts of a metal, a metal oxide, a metal nitride, a metal carbide, a ceramic, wood, a silicon compound, a thermoplastic resin, a thermosetting resin, cellulose, glass, or the like, a film, a fiber, and a sheet.

A surface treatment may be performed on the substrate. Examples of the surface treatment include inorganic treatments such as a silane coupling treatment, a silica coating treatment, and a silica alumina treatment; and washing, activation, and surface treatment functional group-providing treatments such as a plasma treatment, an ultraviolet ray irradiation treatment, an ozone oxidation treatment, a radiation treatment, an X-ray treatment, an electron beam treatment, and a laser treatment.

The film thickness of the polymer layer (i) is preferably thicker than the maximum height Rz of the surface roughness of the surface of the substrate. Unevenness from nano units to micron units usually occurs on the surface of a general substrate. When the polymer layer (i) is excessively thin, the polymer layer (i) cannot completely cover the unevenness, so that protruded parts may be exposed in some cases. Further, even though the polymer layer (i) can barely cover the unevenness, the surface shape of the polymer layer (i) reflects the unevenness of the substrate and the surface of the polymer layer (ii) formed on the polymer layer (i) is also likely to be uneven. Therefore, by making the film thickness of the polymer layer (i) thicker than the maximum height Rz of the surface roughness of the surface of the substrate, the whole surface of the substrate can be covered uniformly and made smooth. In addition, a smoother polymer layer (ii) can be formed over the whole surface of the polymer layer (i).

By providing, on the surface of the substrate, a surface treatment film having a laminated structure including a polymer layer (i) that closely adheres to the substrate and imparts mechanical strength and a polymer layer (ii) exhibiting unique characteristics, the article of the present invention where the performance as a part is imparted or improved can be prepared. The article of the present invention is suitable as an article that can be used various fields, such as a medical member, an electronic material, a display material, a semiconductor material, a mechanical part, a sliding member, and a battery material.

EXAMPLES

Hereinafter, the present invention will be described specifically based on Examples, but the present invention is not limited to these Examples. Note that "parts" and "%" in Examples and Comparative Examples are each on a mass basis unless otherwise noted.

<Synthesis of Polymerization Initiation Group-Containing Polymers>

Synthesis Example 1: Initiation Group Polymer-1

In a reaction container equipped with a stirrer, a stirring blade, a thermometer, a cooling tube, a gas introducing apparatus, and a dropping apparatus, 69.4 parts of a bisphenol A polyepoxy (trade name "jER-1001," manufactured by Mitsubishi Chemical Corporation, molecular weight about 900), 304.0 parts of 3-methoxy-N,N-dimethylpropanamide (manufactured by KJ Chemicals Corporation) (KJCMPA), and 17.8 parts of pyridine were placed, and the resultant mixture was stirred and dissolved. 2-Bromoisobutyric acid bromide (BiBB) in an amount of 43.1 parts was dropped over 2 hours while the reaction container was cooled using an ice bath. The resultant mixture was stirred at room temperature for 3 hours, and then 43.1 parts of methanol was added to terminate the reaction.

In a beaker, 1,250 parts of water and 1,250 parts of methanol were placed, and the reaction solution was slowly added thereto under vigorous stirring with a disper. A precipitate was subjected to filtration and then washed with a mixed solvent of water/methanol=1:1 (mass ratio). The resultant product was dried using a blower type dryer at 100° C. for 24 hours to obtain 95.2 parts of initiation group polymer-1. Initiation group polymer-1 obtained was analyzed by infrared spectroscopy (IR) using an infrared spectrophotometer (trade name "NICOLET 6700," manufactured by Thermo Fisher Scientific Inc.). As a result, absorption derived from an ester bond was observed at around 1735 cm-1. In addition, initiation group polymer-1 obtained was analyzed by a proton nuclear magnetic resonance spectroscopy (1H NMR) using a nuclear magnetic resonance apparatus (trade name "JNM-ECZR 400 MHz," manufactured by JEOL Ltd.). As a result, a peak of a methyl group adjacent to a carbon atom bonded to a bromo group was observed at around δ=1.9 ppm. From the above analysis results, it was ascertained that the functional group represented by formula (1) had been introduced in initiation group polymer-1. Note that the content of the functional group represented by formula (1) in initiation group polymer-1 was 1.6 mmol/g.

Synthesis Example 2: Initiation Group Polymer-2

Initiation group polymer-2 in an amount of 85.2 parts was obtained in the same manner as in Synthesis Example 1 described above except that 53.2 parts of a bisphenol F polyepoxy (trade name "jER-4010P," manufactured by Mitsubishi Chemical Corporation, molecular weight about 8,400) was used in place of the bisphenol A polyepoxy and 313.5 parts of KJCMPA, 23.7 parts of pyridine, and 57.5 parts of BiBB were used. The content of the functional group represented by formula (1) in initiation group polymer-2 was 2.4 mmol/g.

Synthesis Example 3: Initiation Group Polymer-3

In a reaction container, 27.5 parts of 2,2-bis(3-amino-4-hydroxyphenyl) hexafluoropropane (BIS-AP-AF) and 175.5 parts of dimethylacetamide (DMAc) were placed, and the resultant mixture was stirred and dissolved at room temperature. After 16.4 parts of pyromellitic dianhydride (PMDA) was put therein little by little, and the resultant mixture was dissolved, the solution was stirred at room temperature for 12 hours to obtain an amic acid (polymer) solution. The number average molecular weight (Mn) in terms of polystyrene and molecular weight distribution (Mw/Mn, polydispersity index PDI) of the polymer, measured using a gel permeation chromatography (GPC) apparatus (trade name "GPC-101," manufactured by Shoko Science Co., Ltd., column: KD-806M×2, developing solvent: 30 mmol/L lithium bromide+30 mmol/L phosphoric acid-added dimethylformamide (DMF)), were 18,500 and 2.68, respectively. The polymer solution was spread in a vat, and the solvent was distilled away by heating the polymer solution in an oven set to 150° C. for 2 hours under reduced pressure, and then heating was performed at 200° C. for 10 hours to perform cyclization. The resultant product was dissolved in 175.5 parts of N-methyl-2-pyrrolidone (NMP), and the resultant solution was placed in a reaction container. After 11.1 parts of pyridine was added thereto, 25.9 parts of BiBB was dropped therein under cooling with an ice bath. The resultant mixture was stirred at room temperature for 3 hours, and then 25.9 parts of methanol was added thereto to terminate the reaction.

In a beaker, 1,250 parts of water and 1,250 parts of methanol were placed, and the reaction solution was slowly added thereto under vigorous stirring with a disper. A precipitate was subjected to filtration and then washed with a mixed solvent of water/methanol=1:1 (mass ratio). The resultant product was dried using a blower type dryer at 100° C. for 24 hours to obtain 44.6 parts of initiation group polymer-3. The content of the functional group represented by formula (1) in initiation group polymer-3 was 1.8 mmol/g.

Synthesis Example 4: Hydroxy Group-containing Polymer-1 and Initiation Group Polymer-4

In a reaction container, 200 parts of a bisphenol A polyepoxy (trade name "Epotohto YD-128," manufactured by NIPPON STEEL Chemical & Material Co., Ltd., molecular weight about 375), 40 parts of sodium iodide, and 150 parts of N-methyl-2-pyrrolidone were placed. Carbon dioxide was allowed to continuously blow therein to perform reaction at 100° C. for 10 hours while the contents were stirred. Water in an amount of 600 parts was added thereto, and a precipitate was subjected to filtration. The obtained precipitate was recrystallized using toluene to obtain 102 parts of a white powder.

In a reaction container, 100 parts of the obtained white powder, 27.2 parts of hexamethylenediamine, and 190.8 parts of DMF were placed and reacted at 80° C. for 24 hours to obtain hydroxy group-containing polymer-1. Part of the reaction solution was sampled and analyzed by IR to ascertain disappearance of a peak at around 1,800 cm$^{-1}$ derived from a carbonyl group of a carbonate group. The number average molecular weight (Mn) in terms of polystyrene and molecular weight distribution (Mw/Mn, polydispersity index PDI) of hydroxy group-containing polymer-1, measured using a GPC apparatus (developing solvent: DMF), were 11,200 and 2.87, respectively.

After 8.3 parts of pyridine was added to the reaction solution (solution of hydroxy group-containing polymer-1), 21.8 parts of BiBB was dropped over 2 hours under cooling with an ice bath. The resultant mixture was stirred at room temperature for 3 hours, and then 21.8 parts of methanol was added thereto to terminate the reaction. In a beaker, 1,250 parts of water and 1,250 parts of methanol were placed, and the reaction solution was slowly added thereto under vigorous stirring with a disper. A precipitate was subjected to filtration and then washed with a mixed solvent of water/methanol=1:1 (mass ratio). The resultant product was dried using a blower type dryer at 100° C. for 24 hours to obtain 140.6 parts of initiation group polymer-4. The content of the functional group represented by formula (1) in initiation group polymer-4 was 0.7 mmol/g.

Comparative Synthesis Example 1: Comparative Initiation Group Polymer-1

Comparative initiation group polymer-1 in an amount of 72.7 parts was obtained in the same manner as in Synthesis Example 1 described above except that the amount of BiBB was changed to 4.3 parts. The content of the functional group represented by formula (1) in comparative initiation group polymer-1 was 0.3 mmol/g.

<Production (1) of Coating Liquids>

Production Example 1: COT-1

A coating liquid (COT-1) was obtained by mixing 10 parts of initiation group polymer-1 and 1.5 parts of a curing agent (isophoronediamine (IPDA)), and adding propylene glycol monomethyl ether acetate (PGMEA) thereto such that the solid content was 25% and mixing the resultant mixture.

Production Example 2: COT-2

A coating liquid (COT-2) was obtained in the same manner as in Production Example 1 described above except that 10 parts of initiation group polymer-2 and 0.2 parts of the curing agent (IPDA) were used.

Production Example 3: COT-3

A coating liquid (COT-3) was obtained by dissolving 10 parts of initiation group polymer-3 in NMP such that the solid content was 25%.

Production Example 4: COT-4

A coating liquid (COT-4) was obtained by mixing 10 parts of initiation group polymer-4 and 3.5 parts of a curing agent (biuret type polyisocyanate, trade name "Duranate 24A-100," manufactured by Asahi Kasei Corp.), and adding diethylene glycol dimethyl ether acetate (DMDG) thereto such that the solid content was 25% and mixing the resultant mixture.

Comparative Production Example 1: COT-C-1

A coating liquid (COT-C-1) was obtained in the same manner as in Production Example 4 described above except that comparative initiation group polymer-1 was used in place of initiation group polymer-4.

<Production (1) of Polymer Layer (iii)—Provided Substrates>

Production Example 5: SUB-1

An SUS sheet which had been subjected to a surface activation treatment by means of washing and UV ozone was prepared as a substrate. COT-1 was applied on the surface of the prepared substrate to coat the surface using a spin coater under conditions of 2,000 rpm for 30 seconds. The SUS sheet was placed in an oven set to 80° C. and dried for 10 minutes, and then placed in an oven set to 100° C. and heated for 120 minutes for curing to form a polymer layer (iii), and thus SUB-1 which is a polymer layer (iii)-provided substrate was obtained. The film thickness of the polymer layer (iii), as measured by spectroscopic ellipsometry using a spectroscopic ellipsometer (trade name "VASE," manufactured by J.A. Woollam Company), was 1,192 nm. SUB-1 obtained was immersed in THF and washed using ultrasonic waves for 5 minutes, and then the film thickness of the polymer layer (iii) was measured again. As a result, it was ascertained that the film thickness of the polymer layer (iii) hardly changed from before washing and a sufficiently cured polymer layer (iii) had been formed.

Production Examples 6 to 8 and Comparative Production Example 2: SUBs-2 to 4 and SUB-C-1

SUBs-2 to 4 and SUB-C-1, which are polymer layer (iii)-provided substrates, were obtained in the same manner as in Production Example 5 described above except that conditions shown in lower rows in Table 1 were adopted.

TABLE 1

|  |  | Production Example 5 | Production Example 6 | Production Example 7 | Production Example 8 | Comparative Production Example 2 |
|---|---|---|---|---|---|---|
| Polymer layer (iii)-provided substrate |  | SUB-1 | SUB-2 | SUB-3 | SUB-4 | SUB-C-1 |
| Coating liquid |  | COT-1 | COT-2 | COT-3 | COT-4 | COT-C-1 |
| Application conditions | Rotational speed (rpm) | 2,000 | 2,000 | 2,000 | 2,000 | 2,000 |
|  | Time (s) | 30 | 30 | 30 | 30 | 30 |
| Drying conditions | Temperature (° C.) | 80 | 80 | 80 | 80 | 80 |
|  | Time (min) | 10 | 10 | 1 0 | 10 | 10 |
| Curing conditions | Temperature (° C.) | 100 | 100 | 150 | 80 | 100 |
|  | Time (min) | 120 | 120 | 120 | 180 | 120 |
| Film thickness (nm) of polymer layer (iii) |  | 1,192 | 1,241 | 1,056 | 1,305 | 1,290 |

<Production (2) of Coating Liquids>

Production Example 9: COT-5

A coating liquid (COT-5) was obtained by mixing 10 parts of a bisphenol A polyepoxy (trade name "jER-1001," manufactured by Mitsubishi Chemical Corporation) and 1.5 parts of a curing agent (4,4'-diaminodiphenylmethane (MDA)), and adding PGMEA thereto such that the solid content was 25% and mixing the resultant mixture.

Production Example 10: COT-6

BIS-AP-AF in an amount of 5.5 parts and DMAc in an amount of 35.1 parts were mixed, and stirred at room temperature for dissolution. After 3.3 parts of PMDA was added little by little thereto and dissolved, the resultant mixture was stirred at room temperature for 12 hours to obtain a coating liquid (COT-6).

Production Example 11: COT-7

A coating liquid (COT-7) was obtained by mixing 6 parts of hydroxy group-containing polymer-1 and 2.1 parts of a curing agent (biuret type polyisocyanate, trade name "Duranate 24A-100," manufactured by Asahi Kasei Corp.), and adding DMDG thereto such that the solid content was 25% and mixing the resultant mixture.

<Production (2) of Polymer Layer (iii)-Provided Substrates>

Production Example 12: SUB-5

A glass sheet which had been subjected to a surface activation treatment by means of washing and UV ozone was prepared as a substrate. COT-5 was applied on the surface of the prepared substrate to coat the surface using a spin coater under conditions of 2,000 rpm for 30 seconds. The glass sheet was placed in an oven set to 80° C. and dried for 10 minutes, and then placed in an oven set to 150° C. and heated for 60 minutes for curing to form a polymer layer, and thus a polymer layer-provided substrate was obtained. The film thickness of the polymer layer was 1,219 nm. The polymer layer-provided substrate obtained was immersed in THF and washed using ultrasonic waves for 5 minutes, and then the film thickness of the polymer layer was measured again. As a result, it was ascertained that the film thickness of the polymer layer hardly changed from before washing and a sufficiently cured polymer layer had been formed.

In a container made of glass, 157 parts of THF, 5.9 parts of pyridine, and 11.5 parts of BiBB were placed. The polymer-provided substrate was immersed therein, and the upper part of the container was covered with paraffin. The polymer layer-provided substrate was left to stand still at room temperature for 1 hour, then sufficiently washed with THF, and subsequently air-dried to obtain SUB-5, which is a polymer layer (iii)-provided substrate. The film thickness of the polymer layer (iii) was 1,219 nm. The surface (polymer layer (iii)) of the obtained substrate was analyzed by ATR-IR and absorption derived from an ester bond was observed at around 1,735 cm-1. In addition, it was ascertained that the amount of Br was 41 mg/g by combustion IC analysis using an ion chromatography (IC) apparatus (trade name "IC-2001," manufactured by Tosoh Corporation, column: SI-35 4D (manufactured by Shoko Science Co., Ltd.), developing solvent: 3 mmol/L aqueous sodium carbonate solution). From the above analysis results, it was ascertained that the polymer layer (iii) had been formed by the initiation group polymer in which the functional group represented by formula (1) had been introduced. Note that the content of the functional group represented by formula (1) in the initiation group polymer was 1.3 mmol/g.

Production Examples 13 and 14: SUBs-6 and 7

SUBs-6 and 7, which are polymer layer (iii)-provided substrates, were obtained in the same manner as in Production Example 12 described above except that conditions shown in lower rows in Table 2 were adopted. The content of the functional group represented by formula (1) in the initiation group polymer forming the polymer layer (iii) of SUB-6 was 0.8 mmol/g. In addition, the content of the functional group represented by formula (1) in the initiation group polymer forming the polymer layer (iii) of SUB-7 was 0.5 mmol/g.

TABLE 2

| | | Production Example 12 | Production Example 13 | Production Example 14 |
|---|---|---|---|---|
| Polymer layer (iii)-provided substrate | | SUB-5 | SUB-6 | SUB-7 |
| Coating liquid | | COT-5 | COT-6 | COT-7 |
| Application conditions | Rotational speed (rpm) | 2,000 | 2,000 | 2,000 |
| | Time (s) | 30 | 30 | 30 |
| Drying conditions | Temperature (° C.) | 80 | 150 | 80 |
| | Time (min) | 10 | 60 | 10 |
| Curing conditions | Temperature (° C.) | 150 | 220 | 100 |
| | Time (min) | 60 | 720 | 60 |
| Immersion time (min) in reaction solution | | 60 | 60 | 60 |
| Film thickness (nm) of polymer layer (iii) | | 1,219 | 1,575 | 1,010 |

<Production of Surface Treatment Film-Provided Substrate>

Example 1: SUB-8

In an argon atmosphere, 0.00098 parts of ethyl 2-bromoisobutyrate (EBiB), 0.080 parts of copper bromide (II) (CuBr$_2$), 0.46 parts of copper bromide (I) (CuBr), 3.2 parts of 4,4'-dinonyl-2,2'-bipyridyl (dNbpy), 100.1 parts of methyl methacrylate (MMA), and 103.9 parts of anisole were placed in a flask, and a resultant mixture was stirred to prepare a polymerization solution. SUB-1, which is a polymer layer (iii)-provided substrate, was placed in a PTFE container with a screw mouth, and the prepared polymerization solution was poured and filled in the container to cap the container, and the lid part was wound with a paraffin film. This container was placed in an aluminum laminate bag to heat-seal the bag while removing the gas. The container was placed together with the aluminum laminate bag in a high-pressure apparatus (trade name "PV-400," manufactured by Syn Corporation) in which water had been placed as a pressurizing medium, and heated and pressurized to 60° C. and 400 MPa to perform polymerization for 4 hours. In the high-pressure apparatus, a highly viscous solution containing a polymer was generated, and Mn and PDI of the polymer, as measured by sampling part thereof, were 2,540,000 and 1.10, respectively. The substrate taken out of the container was sufficiently washed with THF. The film thickness of the polymer layer (ii), as measured by spectroscopic ellipsometry, was 680 nm, and it was ascertained that a surface treatment film having a laminated structure having the polymer layer (ii) laminated on the polymer layer (i) had been formed on the surface of the SUS sheet.

The surface treatment film-provided substrate obtained is denoted as SUB-8.

Example 2: SUB-9

In an argon atmosphere, 0.00054 parts of EBiB, 55.5 parts of KJCMPA, 55.1 parts of MMA, and 0.41 parts of tetrabutylammonium iodide (TBAI) were placed in a flask, and a resultant mixture was stirred to prepare a polymerization solution. SUB-2, which is a polymer layer (iii)-provided substrate, was placed in a PTFE container with a screw mouth, and the prepared polymerization solution was poured and filled in the container to cap the container, and the lid part was wound with a paraffin film. This container was placed in an aluminum laminate bag to heat-seal the bag while removing the gas. The container was placed together with the aluminum laminate bag in a high-pressure apparatus (trade name "PV-400," manufactured by Syn Corporation) in which water had been placed as a pressurizing medium, and heated and pressurized to 75° C. and 400 MPa to perform polymerization for 4 hours. In the high-pressure apparatus, a highly viscous solution containing a polymer was generated, and Mn and PDI of the polymer, as measured by sampling part thereof, were 2,111,000 and 1.50, respectively. The substrate taken out of the container was sufficiently washed with THF. The film thickness of the polymer layer (ii), as measured by spectroscopic ellipsometry, was 603 nm, and it was ascertained that a surface treatment film having a laminated structure having the polymer layer (ii) laminated on the polymer layer (i) had been formed on the surface of the SUS sheet.

The surface treatment film-provided substrate obtained is denoted as SUB-9.

Examples 3 to 7 and Comparative Example 1: SUBs-10 to 14 and SUB-C-2

SUBs-10 to 14 and SUB-C-2, which are surface treatment film-provided substrates, were obtained in the same manner as in Example 1 or 2 described above except that the polymer layer (iii)-provided substrate and monomers of the types shown in Table 4 were used. Details on the surface treatment film-provided substrates obtained are shown in Table 3. Note that the meanings of abbreviations in Table 3 are shown below.

LMA: lauryl methacrylate
PEGMA: polyethylene glycol monomethyl ether methacrylate (molecular weight 200)

EVALUATIONS

Evaluation (1): SUB-8

SUB-8 obtained in Example 1 was immersed in toluene overnight to swell the surface treatment film. A ball indenter reciprocating slide test of 1,000 times of reciprocation was performed using a friction tester (trade name "Heidon Friction Tester TYPE 14," manufactured by Shinto Scientific Co., Ltd.) under conditions of a load of 1,000 g, an amplitude of 30 mm, and a sliding speed of 200 mm/min. As a result of data analysis, the coefficient of friction was 0.0015, and there was no change in the coefficient of friction even after 1,000 times of reciprocation. When the surface after the slide test was observed with a laser microscope, wear was not recognized. From the above results, it was ascertained that SUB-8 has low friction and has high durability.

Evaluation (2): SUB-11

The slide test was performed on SUB-11 obtained in Example 4 in the same manner as in evaluation (1) described above except that SUB-11 was immersed in diisotridecyl adipate in place of toluene. As a result, the coefficient of friction was 0.0010 and there was no change in the coefficient of friction even after 1,000 times of reciprocation. When the surface after the slide test was observed with a laser microscope, wear was not recognized. From the above results, it was ascertained that SUB-11 has low friction and has high durability.

Evaluation (3): SUB-C-2

The slide test was performed on SUB-C-2 obtained in Comparative Example 1 in the same manner as in evaluation (1) described above. As a result, the initial coefficient of friction was 0.09, but the coefficient of friction gradually increased from about 10 times of reciprocation and the coefficient of friction after 100 times of reciprocation reached 0.2. When the surface after the slide test was observed with a laser microscope, wear marks were observed. SUB-C-2 is a surface treatment film-provided substrate produced using a substrate provided with the polymer layer (iii) formed by a polymer in which the introduction amount of the functional group represented by

TABLE 3

| | | Example 1 | Example 2 | Example 3 | Example 4 | Example 5 | Example 6 | Example 7 | Comparative Example 1 |
|---|---|---|---|---|---|---|---|---|---|
| Surface treatment film-provided substrate | | SUB-8 | SUB-9 | SUB-10 | SUB-11 | SUB-12 | SUB-13 | SUB-14 | SUB-C-2 |
| Polymer layer (iii)-provided substrate | | SUB-1 | SUB-2 | SUB-3 | SUB-4 | SUB-5 | SUB-6 | SUB-7 | SUB-C-1 |
| Film thickness (nm) of polymer layer (i) | | 1,192 | 1,241 | 1,056 | 1,305 | 1,219 | 1,575 | 1,010 | 1,290 |
| Polymer layer (ii) | Monomer | MMA | MMA | MMA | LMA | MMA | LMA | PEGMA | MMA |
| | Mn | 2,540,000 | 2,111,000 | 2,672,000 | 3,242,000 | 2,395,000 | 3,031,000 | 2,522,000 | 2,441,000 |
| | PDI | 1.10 | 1.50 | 1.13 | 1.11 | 1.20 | 1.48 | 1.14 | 1.11 |
| | Film thickness (nm) | 680 | 603 | 670 | 882 | 644 | 845 | 663 | 285 |
| Total film thickness (nm) of polymer layer (i) and polymer layer (ii) | | 1,872 | 1,844 | 1,726 | 2,187 | 1,863 | 2,420 | 1,673 | 1,575 | formula (1) is relatively small. Therefore, the polymer density of the formed polymer layer (ii) was low, so that a concentrated polymer brush was not able to be formed. Accordingly, it is considered that SUB-C-2 had a high coefficient of friction, did not exhibit a high level of lubricity, had poor durability, and was easily worn.

INDUSTRIAL APPLICABILITY

The surface treatment film of the present invention is useful as a material to be provided on the sliding surface of a sliding member that forms various devices belonging to, for example, automobiles, medical equipment, robots, aerospace industries, energy, battery members, precision instruments, and the like.

The invention claimed is:

1. A surface treatment film provided on a surface of a substrate, the surface treatment film having a laminated structure comprising a polymer layer (i) disposed on a surface side of the substrate and a polymer layer (ii) disposed on the polymer layer (i), wherein
the polymer layer (i) comprises a first polymer derived from at least one polymerization initiation group-containing polymer selected from the group consisting of a polyester, a polyurethane, a polyamide, a polyimide, and a polyepoxy each having, in a side chain, a functional group that functions as a polymerization initiation group and is represented by the following formula (1), and in the polymerization initiation group-containing polymer, a content of the functional group represented by the formula (1) is 0.5 mmol/g or more,
the polymer layer (ii) has a film thickness of 200 nm or more, and
the polymer layer (ii) comprises a second polymer comprising a constituent unit derived from at least one monomer selected from the group consisting of an aromatic vinyl-based monomer, a (meth)acrylate-based monomer, and a (meth)acrylamide-based monomer and extending using the functional group represented by the following formula (1) as a polymerization initiation point:

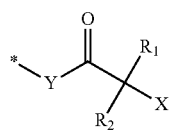

(1)

wherein $R_1$ represents a hydrogen atom, a methyl group, an ethyl group, a phenyl group, or an acyl group, $R_2$ represents a methyl group, an ethyl group, or an acyl group, X represents a chlorine atom, a bromine atom, or an iodine atom, Y represents O or NH, and * shows a bonding position.

2. The surface treatment film according to claim 1, wherein the polymer layer (i) has a three-dimensional network structure.

3. The surface treatment film according to claim 1, wherein the polymer layer (i) has a film thickness of 500 nm or more.

4. The surface treatment film according to claim 1, wherein the polymerization initiation group-containing polymer is at least one selected from the group consisting of a polyester, a polyurethane, a polyimide, and a polyepoxy each having a functional group represented by the formula (1) in a side chain.

5. The surface treatment film according to claim 1, wherein the polymer layer (ii) comprises a solvent and is swollen.

6. The surface treatment film according to claim 1, provided on the surface of the substrate excluding a porous substrate.

7. The surface treatment film according to claim 1, wherein the second polymer has a number average molecular weight of 100,000 or higher in terms of polystyrene, measured by gel permeation chromatography.

8. An article comprising: a substrate; and the surface treatment film according to claim 1 provided on a surface of the substrate.

9. A method for producing the surface treatment film according to claim 1, the method comprising:
a step of forming a polymer layer (iii) comprising the polymerization initiation group-containing polymer on the surface of the substrate; and
a step of polymerizing one or monomers selected from the group consisting of an aromatic vinyl-based monomer, a (meth)acrylate-based monomer, and a (meth)acrylamide-based monomer in the presence of the polymer layer (iii), thereby forming a laminated structure comprising the polymer layer (i) comprising the first polymer derived from the polymerization initiation group-containing polymer and the polymer layer (ii) comprising the second polymer disposed on the polymer layer (i) and comprising a constituent unit derived from the monomer.

10. The method for producing the surface treatment film according to claim 9, wherein the polymerization initiation group-containing polymer is applied on the surface of the substrate to form the polymer layer (iii).

11. The method for producing the surface treatment film according to claim 9, wherein at least one polymer selected from the group consisting of a polyester, a polyurethane, a polyamide, a polyimide, and a polyepoxy each having a hydroxy group or an amino group in a side chain is applied on the surface of the substrate, and thereafter a compound represented by the following formula (2) is reacted with the polymer to form the polymer layer (iii):

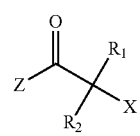

(2)

wherein $R_1$ represents a hydrogen atom, a methyl group, an ethyl group, a phenyl group, or an acyl group, $R_2$ represents a methyl group, an ethyl group, or an acyl group, X represents a chlorine atom, a bromine atom, or an iodine atom, and Z represents a chlorine atom or a bromine atom.

12. The method for producing the surface treatment film according to claim 9, wherein the monomer is subjected to surface-initiated living radical polymerization in the presence of the polymer layer (iii).

13. The method for producing the surface treatment film according to claim 9, wherein the monomer is polymerized under a pressure condition of 10 to 1,000 MPa.

14. The method for producing the surface treatment film according to claim 9, wherein the monomer is polymerized under a pressure condition of 100 to 1,000 MPa.

\* \* \* \* \*